United States Patent [19]

Foley

[11] Patent Number: 6,069,899
[45] Date of Patent: May 30, 2000

[54] HOME AREA NETWORK SYSTEM AND METHOD

[75] Inventor: Peter F. Foley, Los Altos Hills, Calif.

[73] Assignee: Broadcam HomeNetworking, Inc., Irvine, Calif.

[21] Appl. No.: 08/924,449

[22] Filed: Aug. 28, 1997

[51] Int. Cl.[7] .............................. H04L 12/66; H04J 3/16; H04M 11/00

[52] U.S. Cl. .......................... 370/494; 370/463; 370/467; 370/496; 379/93.08; 379/90.01

[58] Field of Search ................................ 370/85, 94, 69, 370/445, 79, 60, 281, 486, 110, 124, 76, 395, 401; 379/93.07, 93.14, 53, 93.08, 90.01; 375/18, 86, 52, 56, 54, 42

[56] References Cited

U.S. PATENT DOCUMENTS

| | | | |
|---|---|---|---|
| 4,596,011 | 6/1986 | Kobayashi et al. | 370/85 |
| 4,785,448 | 11/1988 | Reichert et al. | 370/76 |
| 5,084,903 | 1/1992 | McNamara et al. | 375/18 |
| 5,164,980 | 11/1992 | Bush et al. | 379/53 |
| 5,621,455 | 4/1997 | Rogers et al. | 348/6 |
| 5,668,857 | 9/1997 | McHale | 379/93.07 |
| 5,786,844 | 7/1998 | Rogers et al. | 348/6 |
| 5,896,443 | 4/1999 | Dichter | 379/93.08 |

FOREIGN PATENT DOCUMENTS 0 408 236  1/1991  European Pat. Off. ......... H04N 7/18

OTHER PUBLICATIONS

P.S. Chow et al.: "A Multi–drop In–house ADSL Distribution Network," Serving Humanity Through Communications. Supercomm/ICC, New Orleans, May 1–5, 1994, vol. 1, May 1, 1994, pp. 456–460, XP000438957, Institute of Electrical and Electronics Engineers.

E. Toivanen: "High Quality Fixed Radio Access as a Competitive Local Loop Technology," ISSLS 96. 11th. International Symposium on Subscriber Loops and Services, Melbourne, Feb. 4–9, 1996, No. SYMP. 11, Feb. 4, 1996, pp. 181–186, XP000698317, Institution of Radio and Electronics Engineers Australia.

*Primary Examiner*—Huy D. Vu
*Assistant Examiner*—M. Phan
*Attorney, Agent, or Firm*—Christie, Parker & Hale, LLP

[57] ABSTRACT

A home area network system and method uses existing plain old telephone system (POTS) wiring to network computers in a home without disrupting conventional telephone services. The home area network assigns a network address to each computer coupled to the network and communicates using a broadband communication method occupying the portion of the spectrum above the baseband portion used by ordinary telephone service. The home area network employs quadrature phase shift keying (QPSK) modulation on unshielded twisted pair (UTP) wiring arranged in an arbitrary topology. The home area network additionally employs adaptive equalization for each computer pair coupling as well as adaptive error correction.

15 Claims, 14 Drawing Sheets

HOME AREA NETWORK SYSTEM AND METHOD

BACKGROUND OF THE INVENTION

1. Field of the Invention

This invention relates generally to local area networks and more particularly to local area networks that operate using unshielded twisted pair (UTP) wiring.

2. Description of the Related Art

There is an increasing demand for computer connectivity (e.g., using a local area computer network) within the home. This demand is driven by many factors including: (i) the growing use of in-home computers for education, entertainment and telecommuting; (ii) advances in wide area networking (WAN) technology; and (iii) the anticipated availability of video on demand.

Whereas at one time it was unique for a household to be equipped with more than a single personal computer, it is becoming increasingly common for households to have multiple personal computers. For example, it is common for a household to have a computer in a home office or den and one in each child's bedroom. Each of these computers are preferably equipped with a variety of peripheral devices such as an external hard disk, a printer, a modem, a CD-ROM drive, a facsimile machine and the like. Equipping each computer with its own set of peripheral devices is costly and is typically inefficient from a resource utilization perspective in that each peripheral device attached to a dedicated computer is generally underutilized by that particular machine. Therefore, there is a growing need for the installation of a local area network (LAN) in a residence to enable the sharing of computing resources and peripheral devices.

Beyond sharing computing resources and peripheral devices, local area networks also provide the benefit of shared access to a gateway device providing inter connectivity with a wide area network (WAN). Thus, there is further motivation for installation of in-home local area networks.

Further, as WAN technology continues to develop and as digital information (including digital video) becomes more readily available in the home, the demand for in-home local area networks will continue to grow. In particular, it is expected that developments in WAN technology will bring digital video streams into the home on an "on-demand" basis. As this happens, it is expected that there will be a further increased demand for local area networks in the home in order to pipe digital data (including digital video) into more than one room in a household.

Local area networking (LAN) technology connects computers within a relatively small geographic area such as within a single building or home. Conventional LAN technology has developed primarily for use outside the home in a business or office environment and accordingly does not address the desired attributes of a LAN installed in a home environment. For example, primary desired attributes for a home LAN are: (i) support of arbitrary network topologies; (ii) ease of installation (a home LAN should be easily installed by a home user and should minimize the requirement to "pull" new cable); and (iii) low cost (home LAN purchasers are generally cost sensitive). Conventional LAN technology does not adequately provide these attributes.

FIG. 1 is a functional block diagram of conventional LAN technology used at a customer premises. In accordance with the conventional system, a LAN 101 (such as an ethernet network using coaxial cable) is installed at a customer premises in addition to any plain old telephone service (POTS) wiring 102 that may be in place. POTS wiring 102 delivers ordinary telephone service and LAN 101 provides a computer network coupling computers 105. POTS wiring 102 is coupled to a subscriber loop 103 that couples to a central office that is part of the public switched telephone network (PSTN). POTS wiring 102 is generally unshielded twisted pair (UTP) copper wiring that runs internally in the walls of a home and connects conventional telecommunications devices 104 (e.g. POTS-compatible telephones) to subscriber loop 103. POTS wiring 102 additionally couples to the POTS ports on conventional modem 106 and facsimile machine 107 to deliver ordinary telephone service to those devices.

FIG. 2 is a functional block diagram of another conventional LAN system installed at a customer premises. This conventional system includes LAN 201, POTS wiring 102, subscriber loop 103, conventional telecommunications devices 104, computer 105, conventional modem 106 and conventional facsimile machine 107. LAN 201 is an ethernet network that uses UTP 10baseT technology. LAN 201, therefore, includes a 10baseT hub 202 and a new installation of UTP wiring connecting each computer 105 in a star configuration.

Conventional LAN technology as shown in FIGS. 1 and 2 generally requires the installation of a new wiring infrastructure (e.g., LAN 101 or LAN 201) that is dedicated for use as a networking medium. Installing this wiring infrastructure generally requires the "pulling" of new cables throughout the premises (e.g., the home). This type of installation is complex, time consuming, cost prohibitive and is particularly disruptive in a home environment that is not generally equipped with false ceilings or means for readily running conduit and wiring. These drawbacks are of particular significance in the home area network market where a user-installable configuration is desirable.

Thus, there is a need for an improved system and method for providing a home area network.

SUMMARY OF THE INVENTION

In accordance with the present invention, there is provided a system and method for providing a local area network using existing plain old telephone service (POTS) wiring at a customer premises. A customer premises is a telephone subscriber site that is conventionally coupled to a subscriber loop which in turn is coupled to the public switched telephone network (PSTN) through a telephone central office. Point to point connections between two customer premises are conventionally established to enable the communication between telecommunications devices (e.g., POTS compatible telephones) located at the two different customer premises.

POTS wiring at a customer premises conventionally consists of unshielded twisted pair wires that carry baseband signals occupying a portion of the spectrum below a selected frequency. The present invention uses an unused portion of the spectrum of existing customer premises POTS wiring to network multiple network clients. This frequency division multiplexed approach allows for the networking of multiple networking clients leveraging off of installed POTS wiring without disrupting the ordinary telephone service also provided on the installed POTS wiring.

In accordance with the present invention, general purpose computers, specific purpose computers, computer appliances and other types of computer-enabled devices (collectively and individually referenced herein as "network client") are networked using the existing POTS wiring system at a customer premise. Each network client in the POTS network is coupled to the POTS wiring system to generate a peer to peer connection (a symmetric communication channel) between each network client pair. Each POTS networked network client communicates digital information to other network clients at the customer premises by modulating digital information to generate modulated signals occupying a bandlimited portion of the spectrum above the portion occupied by conventional POTS baseband signals. Advantageously, because the portion of the spectrum used in the network is bandlimited to a portion above the portion occupied by conventional POTS baseband signals, the network does not disrupt or interfere with ordinary telephone service including lifeline service at the customer premises. Thus, in accordance with the invention, conventional POTS wiring is advantageously used for both conventional call sending and receiving (using conventional POTS telecommunications devices) and at the same time is used for computer networking at the customer premises. The ability to use existing POTS wiring for establishing a home area network (HAN) without disrupting conventional telephone service is particularly desirable given the number of homes already equipped with POTS wiring running to multiple rooms. Further, the system and method of the present invention works with an arbitrary network topology and thus there is no need to adhere to a particular network topology (e.g., daisy chain, tree or star) during installation.

In accordance with another aspect of the invention a passive lowpass filter is located at the demarcation between the subscriber loop and the customer premises (e.g., where the customer premises couples to the subscriber loop). The filter has a stopband including at least the portion of the spectrum occupied by the HAN signals. The filter attenuates a portion of the spectrum above baseband to isolate the HAN signals (e.g., those signals attributable to the HAN) from the subscriber loop. Advantageously, by isolating the HAN signals from the subscriber loop, the present invention prevents HAN signals from being placed on the subscriber loop and keeps noise generated on the subscriber loop, in the spectral range of the HAN signals, from intruding on the HAN. The passive lowpass filter passes the DC signal (included in ordinary POTS services) that powers customer premises equipment such as ordinary POTS telephones. Because the filter is passive, a power failure does not interrupt its operation. The ability to deliver ordinary telephone service despite a power failure at the customer premises is referred to herein as "lifeline service". Using such a passive filter thus provides further the advantage of allowing continued support of ordinary telephone service despite a power failure at a customer premises.

Further in accordance with the this aspect of the invention, the passive lowpass filter is a diplexer filter. The diplexer filter includes a lowpass filter having a stop band starting in the HAN spectral range coupled to a highpass filter having a passband in the HAN spectral range. Each of the lowpass and highpass filters in the diplexer present a high stopband impedance to both the source and the load and preferably have the same cutoff frequencies. The highpass filter has a resistive load selected to provide a matched termination to the transmitting network clients. The matched termination matches the characteristic impedance of the POTS wiring in the HAN spectral range. Advantageously, the matched termination provided by the diplexer minimizes signal reflections on the network and improves overall signal quality.

In accordance with another aspect of the invention, a passive diplexer having a lowpass filter portion with a stopband corresponding to the frequency range of the HAN signals and a highpass filter portion coupled to a resistive load. The filter is installed at the coupling of customer premises equipment (e.g., conventional POTS telephones and conventional modems) to provide matching termination to the HAN, to prevent HAN signals from being aliased down into the frequency range used by the customer premises equipment, and to keep energy generated by the customer premises equipment in the HAN spectral range from intruding on the HAN. Advantageously, because the filter is passive, lifeline service is provided to the customer premises.

In accordance with yet another aspect of the invention, the subscriber loop is disposed to send and receive bandpass subscriber loop signals in addition to baseband signals. An exemplary bandpass signal present on a subscriber loop is a signal compatible with a digital subscriber line (xDSL) protocol such as the asymmetrical digital subscriber line (ADSL) protocol. In accordance with this aspect of the invention, the modulated digital signals at the customer premises occupy a portion of the spectrum above the spectrum occupied by the subscriber loop baseband and bandpass signals. In an embodiment compatible with ADSL the modulated digital signals at the customer premises occupy a portion of the spectrum above 1.1 megahertz such as the frequency band ranging from approximately 4 MHz to 18 MHz. The present invention is therefore advantageously compatible not only with conventional baseband telephone signals present on the subscriber loop but also is compatible with bandpass xDSL protocols being used to deliver digital data over the PSTN.

In accordance with yet another aspect of the present invention, the modulation of the digital information on the HAN uses quadrature phase shift keying (QPSK) modulation. The use of QPSK modulation is particularly advantageous in the present invention due to the simplicity of its implementation and robustness of operation as compared to other frequency modulation techniques. Use of QPSK modulation is additionally advantageous given the high likelihood of impaired channels caused by the varied and unpredictable nature of the network topologies and ingress sources that are present in a POTS wiring system at a customer premises.

In accordance with yet another aspect of the present invention, the modulation of digital information on the HAN uses quadrature amplitude modulation (QAM-4).

The features and advantages described in the specification are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

DESCRIPTION OF THE PREFERRED EMBODIMENT

FIGS. 3–11 depict a preferred embodiment of the present invention for purposes of illustration only. One skilled in the art will readily recognize from the following discussion that alternative embodiments of the structures and methods illustrated herein may be employed without departing from the principles of the invention described herein.

Figure 1:
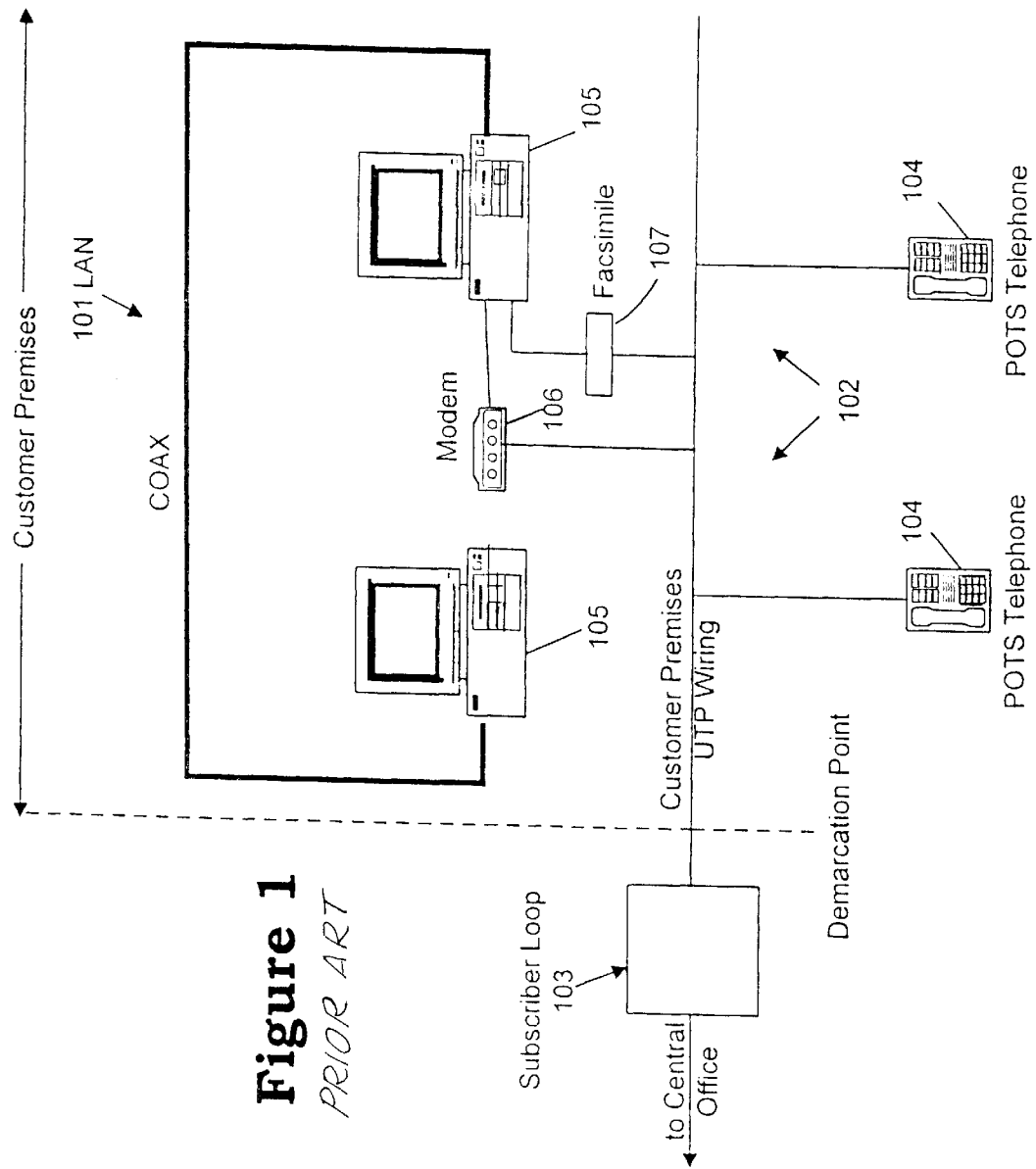
FIG. 1 illustrates a conventional local area network installed at a customer premises.
Figure 2:
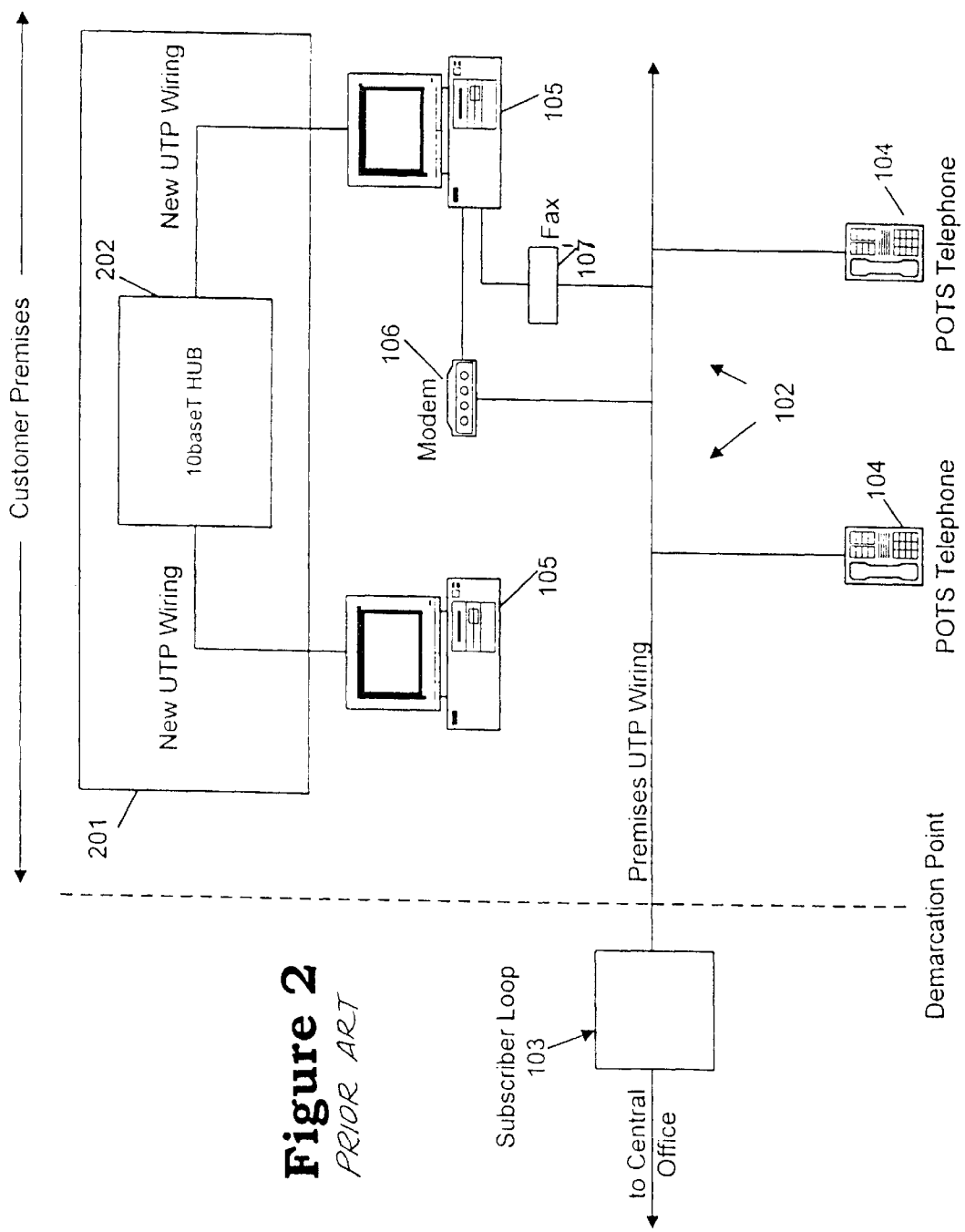
FIG. 2 illustrates another conventional local area network installed at a customer premises.
Figure 3:
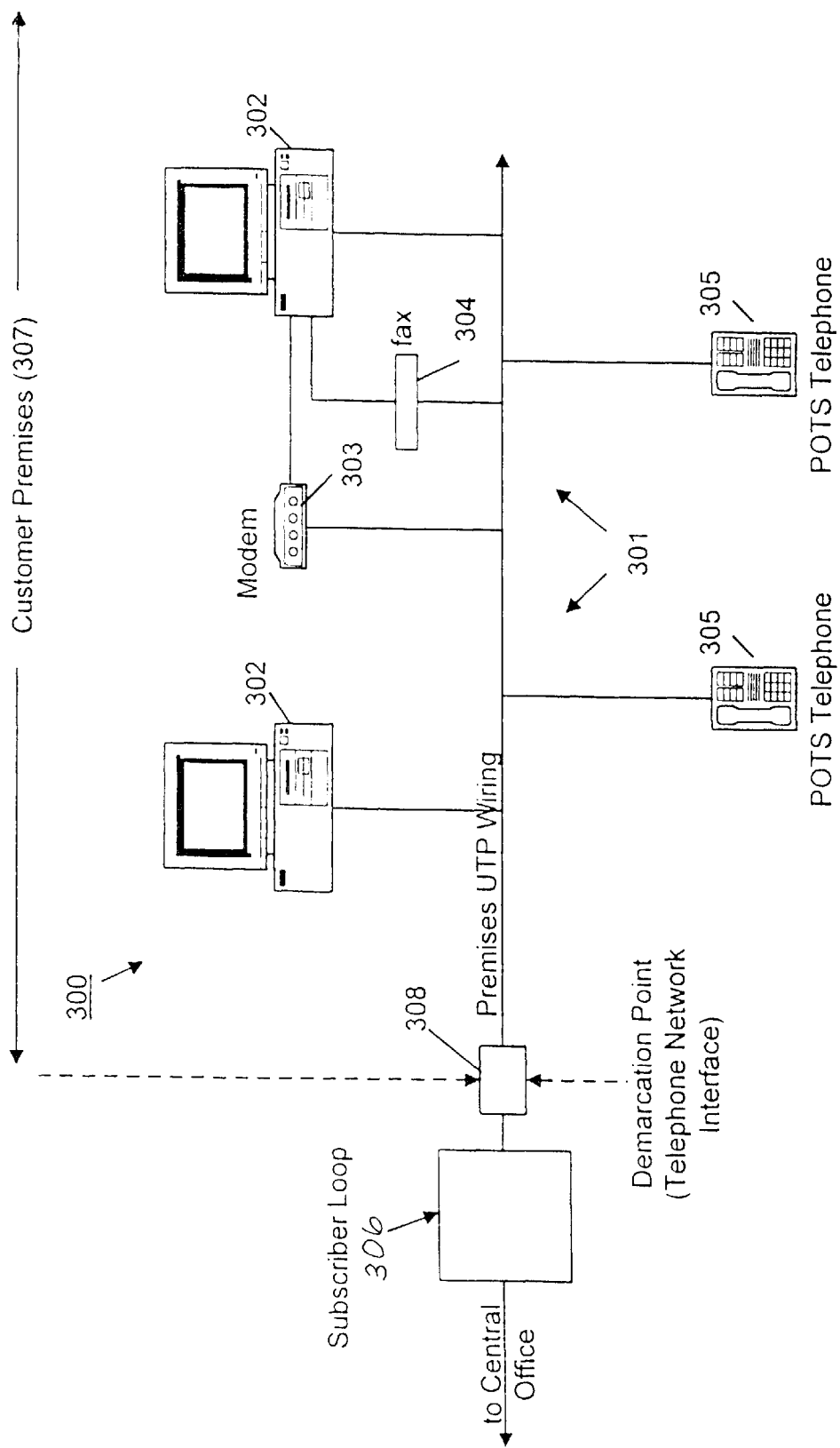
FIG. 3 illustrates a home area network (HAN) using installed POTS wiring in accordance with the present invention.

FIG. 3 illustrates a home area network (HAN) 300 in accordance with the present invention. HAN 300 includes existing (installed) plain old telephone service (POTS) wiring 301, network clients 302, the computer port side of modem 303 and fax 304. POTS wiring 301 provides wiring infrastructure used to network multiple network clients 302 at a customer premises 307.

POTS wiring 301 is conventional unshielded twisted pair (UTP) wiring that is generally routed internally in the walls of the customer premises 307 (e.g., a house) to various locations (e.g., rooms) within customer premises 307.

Subscriber loop 306 (also called a "local loop") is a physical wiring link that directly connects an individual customer premises 307 to the central office. Subscriber loop 306 is unshielded twisted pair (UTP) wire. UTP wire causes signal attenuation over extended distances. This attenuation is greater for higher frequency signals. To accommodate the constraints imposed by the electrical properties of subscriber loop 306, subscriber loop 306 line lengths are generally confined to a length no greater than 18 kilometers, although longer line lengths are sometimes used. Nonetheless, subscriber loop 306 is not well suited to transmit signals greater than 1.1 MHz.

Customer premises 307 is a subscriber premises that has arranged (generally for a monthly telephone service fee or for a per calling minute fee) with a local provider (such as a local telephone company) for a connection to a central office. A central office is a central telephone office (also called a local exchange) that provides local switching and non-local switching (via the Public Switched Telephone Network (PSTN)).

Figure 5A:
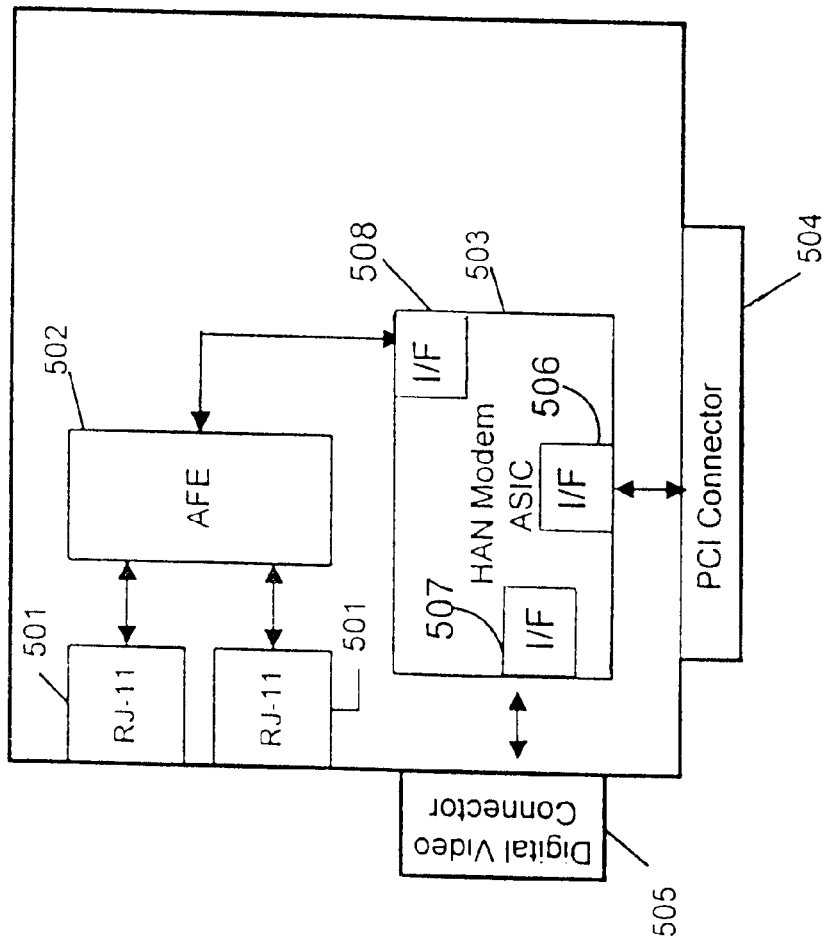
FIG. 5A is a functional block diagram of a network interface card (NIC) included in a computer installed in the HAN shown in FIG. 3.

Network client 302 is personal computer equipped with a network interface card (shown in FIG. 5A). It should be understood, however, that the principles of the present invention apply to HANS including other types of network clients such as specific purpose computers, computer appliances, computer-enabled devices or other types of network devices.

In addition to providing connectivity among (e.g., networking) network clients 302, POTS wiring 301 connects to conventional POTS-compatible POTS on telecommunications devices (such as telephones 305, modem 303 and facsimile machine 304). POTS wiring 301 thus additionally couples telephone 305 and modem 303 to a central office via subscriber loop 306. The central office, in turn, connects the POTS-compatible devices to another POTS-compatible device located off premises.

Advantageously, HAN 300 connects (networks) network clients 302 without disrupting ordinary telephone and telecommunications services (including digital subscriber line (xDSL)) services conventionally provided on POTS wiring 301. HAN 300 and conventional POTS services simultaneously utilize POTS wiring 301 by frequency division multiplexing network related signals (HAN signals) and POTS signals to achieve spectral avoidance.

Figure 4A:
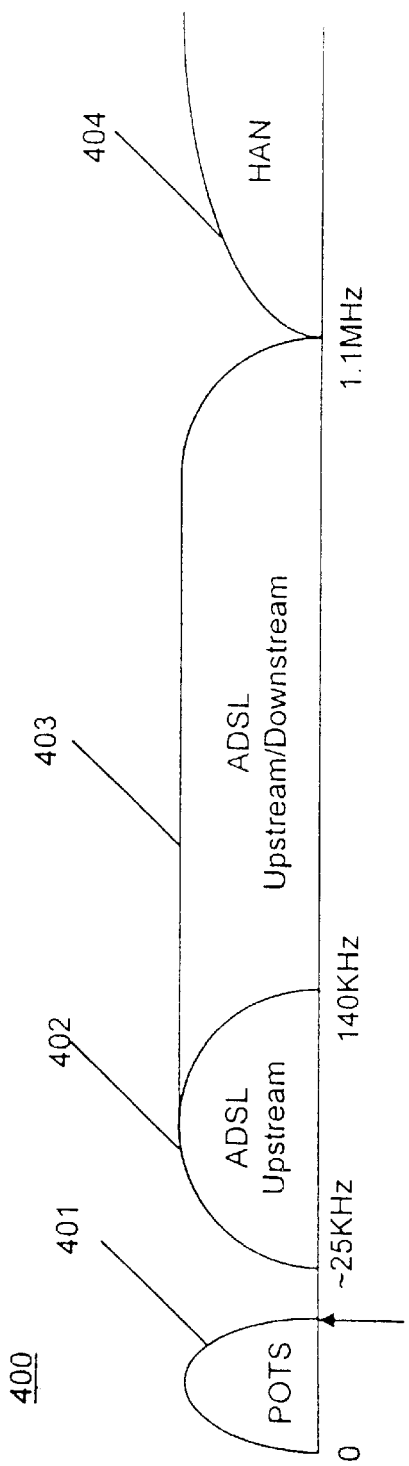
FIG. 4A is an illustration of spectrum utilization on the POTS wiring shown in FIG. 3.

FIG. 4A is an illustration of the utilization of spectrum 400 on POTS wiring 301 at a customer premises in accordance with the present invention. Spectrum 400 shows four separate frequency bands in which information is communicated: a POTS band 401, an ADSL upstream band 402, an ADSL downstream band 403 and HAN band 404. POTS band 401 is baseband up to approximately 4 kHz. Conventional POTS signals such as voice signals, modem signals and facsimile signals occupy the baseband region of the spectrum with a maximum bandwidth of 4 kHz. ADSL upstream band 402 and ADSL downstream band 403 both carry signals in accordance with asymmetrical digital subscriber line (ADSL) protocol. ADSL upstream band 402 occupies a band ranging from 25 kHz to 1.1 MHz and carries ADSL signals from a customer premises to a central office. ADSL downstream band 403 occupies a band ranging from 140 kHz up to 1.1 MHz and carries ADSL signal from a central office to a customer premises. Instead of employing FDM to separate the upstream and downstream bands, the ADSL protocol allows upstream band 402 and downstream band 403 to overlap arid share spectrum from 25 KHz to 140 KHz using echo cancellation. ADSL supports full-duplex communication. In accordance with ADSL protocol, the bandwidth allocated to downstream signals (downstream band 403) is greater than the bandwidth allocated to the upstream channel (upstream band 402) band in order to better accommodate models of information flow that anticipate a greater amount of data flowing into a customer premises rather than out of a customer premises.

HAN band 404 occupies the portion of the spectrum above 1.1 MHz. Due to line lengths associated with subscriber loops and the resulting signal attenuation at frequencies above 1.1 MHz, it is not practical to use this portion (the portion above 1.1 MHz) of the spectrum for communications between a central office and a customer premises. Line distances within a customer premises, however, are sufficiently short that signals above the 1.1 MHz range are successfully transmitted and received within a customer premises. HAN 300 therefore, utilizes the portion of spectrum above 1.1 MHz thereby avoiding that portion of the spectrum utilized at the central office to send signals to a customer premises.

Figure 4B:
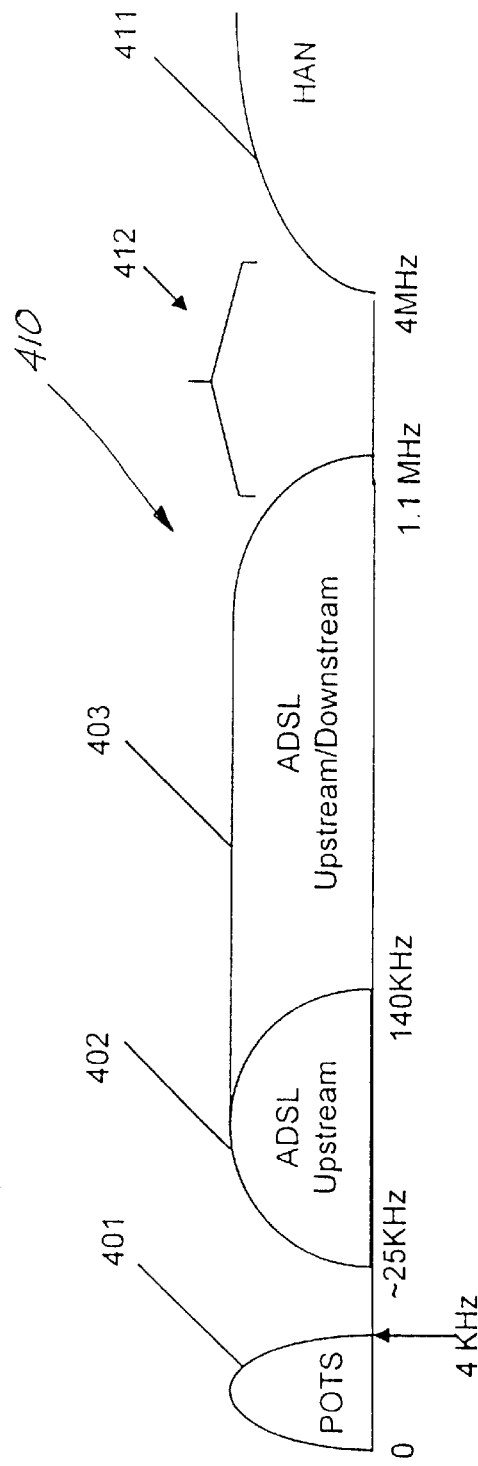
FIG. 4B is an illustration of alternative spectrum utilization on the POTS wiring shown in FIG. 3.

FIG. 4B is an illustration of an alternative utilization of spectrum 410 on POTS wiring 301 in accordance with the invention. Spectrum 410 includes POTS band 401, ADSL upstream band 402, ADSL downstream band 403 and HAN band 411. HAN band 411 occupies the portion of the spectrum above 4 MHz. Spectrum 410 thus includes spacing band 412. Spacing band 412 is a "dead band" that is not occupied by signal, other than any signal due to frequency bleeding from adjacent bands (e.g., from ADSL downstream band 403 or HAN band 411). Use of spacing band 412 eases filter implementation by: (i) eliminating the need for strict filter characteristics; (ii) reducing the impact of group delay by allowing the placement of the filter cutoff frequency further up into the dead band; and (iii) providing a frequency band to transition between the highpass and lowpass sections of the diplex filters discussed below.

HAN 300 is a symmetric network. This means that data rates in the transmit and receive directions can be the same. Further, HAN 300 provides a half diplex channel meaning that a single network client transmits at a time. Thus HAN bands 404, 411 accommodate both transmit and receive signals in a half diplex mode of operation.

Referring back again to FIG. 3, each network client 302 is equipped with an internally mounted HAN network interface card (NIC). FIG. 5A is a functional block diagram of a preferred network interface card (NIC) 500 in accordance with the present invention. NIC 500 includes RJ-11 jacks 501, analog front end (AFE) block 502, HAN modem ASIC 503, PCI connector 504 and digital video connector 505. RJ-11 jacks 501 are conventional POTS-compatible telephone jacks. Thus, NIC 500 (and hence network client 302) are coupled to HAN 300 in the same manner that conventional telephones are coupled to the central office, by simply plugging into an existing RJ-11 wall jack. AFE block 502 is an interface circuit that performs analog signal conditioning and provides electrical isolation and surge protection in compliance with FCC Part-68 for connection to the PSTN. In order to facilitate HAN connectivity to multiple POTS lines (e.g., multiple networks of POTS wiring 301) as is the case with a customer premises 306 equipped with two phone lines, AFE block 502 is equipped with two RJ-11 jacks 501. In the two-phone-line-architecture a single network is created by bridging the separate phone lines in the HAN spectral domain.

HAN modem ASIC 503 is an application specific integrated circuit (ASIC) including circuit modules for performing signal processing including signal modulation and demodulation. HAN modem ASIC 503 additionally includes an AFE interface 508, a PCI interface 506 and a video interface 507. PCI interface 506 provides the interface formatting and hand shake signals used to communicate with the CPU on network client 302 over a PCI bus. In an alternative embodiment, communication with the network client CPU is over an ISA bus. Video interface 507 couples a digital video stream, such as received from a satellite (DSS/DVB) receiver to the HAN modem ASIC 503. Advantageously, video connector 505 and video interface 507 together allow any NIC 500 to directly forward a digital video stream from a source (such as a digital cable TV receiver, or a satellite receiver) onto HAN 300 without requiring the host CPU (the network client CPU) to receive the video and without routing the video over the PCI bus. This direct interface improves system performance and makes each NIC 500 "video ready".

Figure 5B:
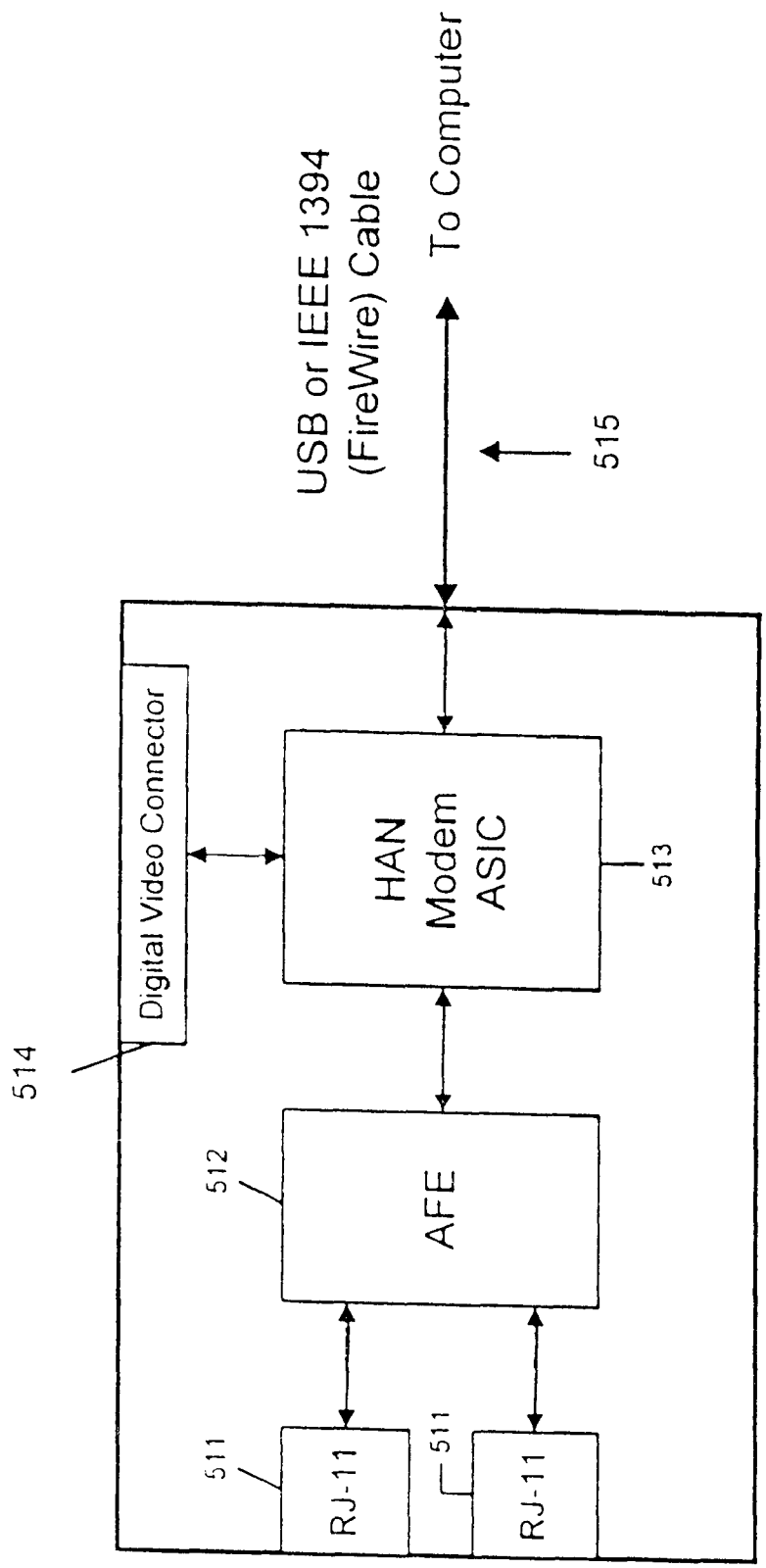
FIG. 5B is a functional block diagram of an external network peripheral interface used to connect a computer to the HAN shown in FIG. 3.

In another preferred embodiment, network client 302 is not connected to HAN 300 via NIC 500 but instead is connected via a HAN peripheral device external to network client 302. FIG. 5B shows a HAN peripheral device 510 in accordance with the invention. HAN peripheral device 510 includes RJ-11 jacks 511, AFE block 512, HAN modem ASIC 513, digital video connector 514 and external interface bus 515. Interface bus 515 is a conventional interface bus such as USB or IEEE 1394 (FireWire). HAN modem ASIC 513 includes signal processing functionality (e.g., modulation and demodulation), an AFE interface, a digital video interface and an external bus interface. HAN peripheral device 510 allows any network client 302 with a USB or IEEE 1394 (FireWire) interface to connect to HAN 3100.

In alternative embodiments, HAN modem ASICs 5013 and 513 additionally include POTS modem functionality (e.g., V.34 or V.56) thereby providing access to both HAN network signals and to conventional POTS signals. Further in accordance with this embodiment, AFE blocks 502 and 512 additionally include a conventional PSTN Data Access Arrangement (DAA) to provide POTS modem capability. This added POTS modem capability advantageously provides a user with connectivity to both the HAN and conventional telecommunications services on a single NIC 500 (or HAN peripheral device 510).

NIC 500 provides processing circuitry to demodulate and decode HAN signals on the receive side and to encode and modulate HAN signals on the transmit side. In a preferred embodiment, HAN signals are modulated using quadrature phase shift keying (QPSK). QPSK modulation is a relatively simple and thus a low cost modulation scheme, though riot noted for spectral efficiency. Advantageously, the system is not constrained to a narrow spectral band due to the relatively short lengths of UTP installed at a customer premises. As discussed previously, as the length of UTP increases, signal attenuation becomes a limiting factor, particularly at higher signal frequencies. Therefore, bit rates are maintained by using spectrum up to 40 MHz. In an alternative embodiment, HAN signals are modulated using quadrature amplitude modulation having either 4 states (QAM-4) or 16 states (QAM-16).

Figure 6:
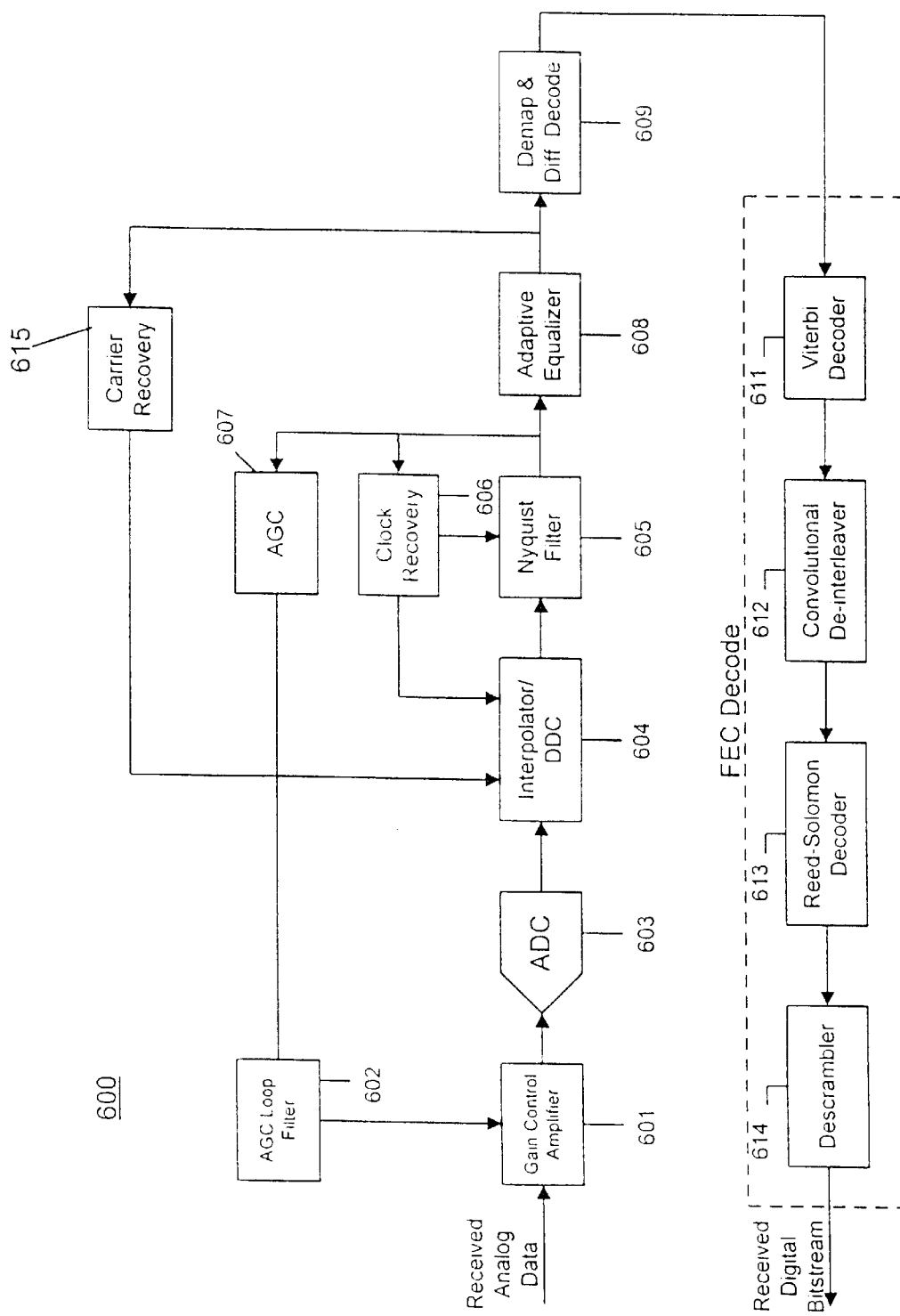
FIG. 6 is a flow diagram of the receive-side processing steps performed by the NICs shown in FIGS. 5A and 5B.

FIG. 6 is a functional block diagram of the receive-side processing 600 performed by HAN modem ASIC 503, 513. The processing blocks include gain control amplifier 601, AGC loop filter 602, ADC 603, interpolator/DDC 604, Nyquist filter 605, clock recovery 606, AGC 607, adaptive equalizer 608, demap and differential decoder 609, carrier recovery module 615 and forward error correction logic 610. Forward error correction logic 611 includes viterbi decoder 611, convolutional de-interleaver 612, Reed-Solomon decoder 613 and descrambler 614. The receive side processing blocks process, demodulate and decode a differentially encoded analog signal received from the HAN.

The received analog signal is coupled to gain control amplifier 601. The voltage of the received signal is first adjusted by gain control amplifier 601 to bring the signal into a preferred range for linear sampling by analog to digital converter (ADC) 603. The sampled received signal is then fed to an interpolator/digital down converter (DDC) 604. Interpolator/DDC 604 downconverts the passband input signal to baseband. Interpolator/DDC 604 is driven by clock recovery circuit 606 and carrier recovery module 615 to generate four samples per symbol. Clock recovery circuit 606 recovers the symbol clock. Carrier recover module 615 recovers the carrier frequency. In some implementations, in order to decrease the clock rate of the subsequent downstream processing, the incoming data is split into inphase and quadrature streams (not shown), typically with two samples per symbol. The data are then passed through matching Nyquist filter 605 for optimal signal detection. After filtering, the signal is coupled to adaptive equalizer 608 which removes the intersymbol interference caused principally by the hostile reflection/multipath environment of customer premises wiring (POTS wiring). Equalization is carried out prior to any processing which is not linear time invariant such as the decision circuitry in demap and differential decode 609. Demap and differential decoder 609 includes a demapper and a differential decoder. The demapper decodes the output symbol into a serial bit stream according to the constellation transmitted (2 bits for QPSK or QAM-4, 4 bits for QAM-16), and then the result is passed through the differential decoder. The received analog data stream is differentially encoded on the transmit side to allow simple coherent detection and prevent phase ambiguities in the recovered carrier from resulting in inaccurate data recovery.

The receive side processing blocks also include circuit blocks for clock recovery (clock recovery 606), carrier recovery module 615, and automatic gain control (AGC 607). The clock and carrier recovery circuits 606, 615 utilize phase lock techniques to maintain lock in the presence of noise. They also include sweep generators for initial signal acquisition. When, in an alternative embodiment, the gain control amplifier 601 is located externally to HAN modem ASIC 503, 513, either as a separate amplifier, or within a tuner, AGC 607 generates a PWM signal that is low pass filtered using an external LC filter (not shown).

The differentially decoded serial bit stream then enters forward error correction (FEC) logic 610. Preferably, data is encoded using a block outer code, such as Reed-Solomon, followed by a convolutional inner code. Viterbi decoder 611 recovers the convolutionally encoded data. Convolutional de-interleaver 612 then de-interleaves the data. Next, a Reed-Solomon decoder 613 verifies and error corrects the data using the check data added to the bitstream. Depending on the propensity of the channel to burst noise, the data may have been interleaved to effectively spread the burst errors over time where they can be effectively corrected by the convolutional and/or block coding. Although shown as part of the FEC block, the function of descrambler 614 is to recover the bit stream that was randomized in order to spread the transmit signal energy and prevent any prominent spectral lines that might arise due to periodic data patterns in the bit stream.

The result of processing in accordance with the functional blocks shown in FIG. 6 is a received digital bit stream that is coupled to the network client CPU using the appropriate interface protocol (e.g., PCI, ISA, USB, IEEE 1394).

Figure 7:
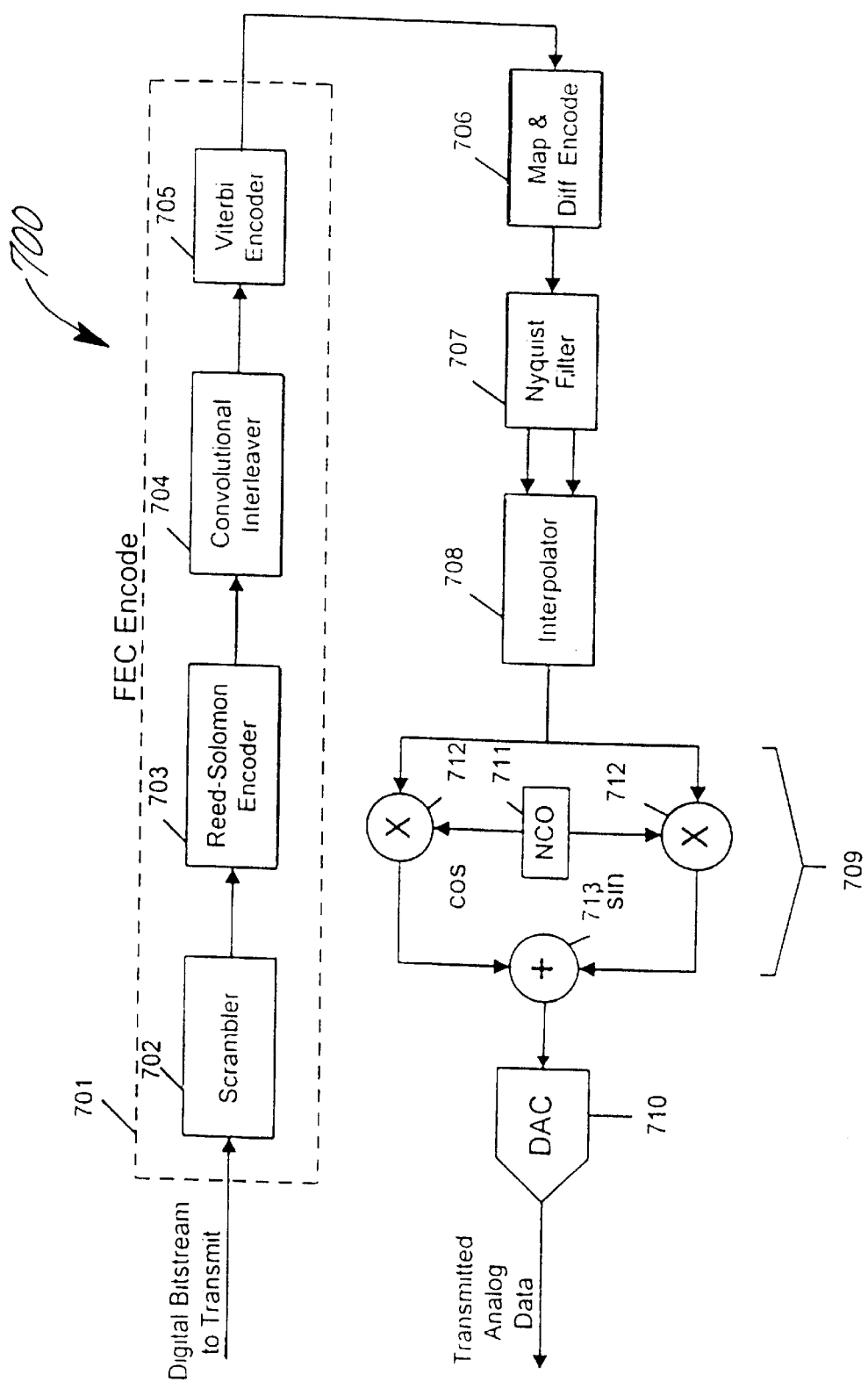
FIG. 7 is a flow diagram of the transmit-side processing steps performed by the NICs shown in FIGS. 5A and 5B.

FIG. 7 is a functional block diagram of the transmit-side processing blocks 700 of HAN modem ASIC 503, 513. The transmit-side processing blocks include forward error correction encoder 701 (including Reed-Solomon encoder 703, convolutional interleaver 704, viterbi encoder 705), scrambler 702, mapper and differential encoder 706, Nyquist filter 707, interpolator 708, digital mixer 709, digital-to-analog converter (DAC) 710. Digital mixer 709 includes number controlled oscillator (NCO) 711, multipliers 712 and adder 713.

In operation, HAN modem ASIC 503, 513 receives a digital bit stream for transmission over HAN 300. The incoming bit stream is first randomized by scrambler 702. Scrambler 702 uses a linear feedback shift register implementing a fifteenth order generator polynomial. This scrambling disperses the transmit energy throughout the available band and prevents the emergence of strong spectral lines corresponding to periodic data in the input stream. The randomized output is then fed into the FEC 701, which includes an outer code implemented using a Reed-Solomon block, followed by a Viterbi convolutional inner code. Depending on the propensity of the channel to burst noise, the data is also interleaved using convolutional interleaver 704 to effectively spread the burst errors over time where they can be corrected by the convolutional and/or block encoding.

Mapper and differential encoder 706 next receives the serial bit stream for processing. The serial bit stream is mapped into symbol space according to the constellation in use (2 bits for QPSK or QAM-4, 4 bits for QAM-16), and differentially encoded to facilitate coherent detection and unambiguous carrier/phase recovery at the receiver. This processing generates symbol data.

The symbol data is then Nyquist filtered using Nyquist filter 707 to bandlimit the signal to the minimum required for symbol recovery, and minimize intersymbol interference. Nyquist filter 707 is preferably realized using a transversal finite impulse response (FIR) structure.

The filtered symbol data is then interpolated by interpolator 708 before being mixed (by digital mixer 709) into the in-phase and quadrature phase components of the PSK signal. A numerically controlled oscillator 711 (preferably implemented using a table lookup) provides the sine and cosine coefficient data. The quadrature components are then summed using summer 713 (preferably resistively) prior to being fed to DAC 710.

Now referring again to FIGS. 5A, 5B, the analog transmission signal generated by HAN modem ASIC 503, 513 is next coupled to POTS wiring 301 via AFE 502, 512. The resulting analog transmission signal is a bandpass signal that occupies a region of the spectrum above the portion occupied by conventional POTS services. Thus, the analog transmission signals (the HAN network signals) are transmitted using the POTS wiring 301 at a customer premises 306 without interfering with conventional POTS signals. Advantageously, HAN network signals and conventional POTS services signals (e.g., conventional call connections and xDSL signals) simultaneously use the same wiring infrastructure at a customer premises. The installation of a separate client network infrastructure is avoided and instead existing POTS wiring is leveraged for a second, additional use.

In a preferred embodiment, network clients 302 share the HAN bandwidth in accordance with a time division multiple access (TDMA) protocol. In the preferred HAN embodiment where only one spectral band is utilized, only one receiver/transmitter pair of network clients 302 communicates at a time and each receiver/transmitter pair are allocated a time slot for communication. Network usage thus transitions from one receiver/transmitter pair to the next. In this approach, overall network performance is significantly affected by the speed at which receiver/transmitter network client 302 pairs effectively transition into network usage. To effect this transition efficiently, selected signal processing control and configuration parameters used in the receive and transmit processing 600, 700 shown in FIGS. 6 and 7 are predetermined during an initialization process and than stored locally on the HAN modem ASIC 503. The stored parameters are then used to initialize both the receive-side and transmit-side processing 600 and 700, respectively each time a receiver/transmitter pair initiates communication.

In particular, during the HAN system initialization process, training is conducted to determine and store processing parameters associated with each receiver-transmitter network client pair (e.g., each communication channel). During network operation, HAN signals (the modulated information signals) are modified in accordance with the stored processing parameters for the associated receiver/transmitter pair. Keeping local copies of processing parameters at each network client avoids retraining each time a receiver is to receive data from a new transmitter and allows rapid switching of receivers and transmitters.

In one embodiment, the stored processing parameters (modem parameters) include are a set of adaptive equalization coefficients associated with adaptive equalizer 608 and the HAN signals are modified by applying an equalization filter using the adaptive filter coefficients. In accordance with this embodiment, the initialization process includes a training session for each communication channel to generate a set of adaptive filter coefficients that match the characteristics of the channel. By determining and storing the coefficients for each channel during an initialization process, network throughput and performance is improved.

Other modem parameters which are preferably predetermined and stored include control parameters for AGC 607, for clock recovery 606, carrier recovery 615, and NCO 711 and filter coefficients for Nyquist filter 605, Nyquist filter 707, and interpolator 708.

In accordance with another embodiment of the present invention, the system and method monitors the channel characteristics associated with a plurality of communication channels to detect any change in the channel characteristics. After detecting a change, the system and method can either update the current modem parameters from the stored set of pre-trained parameters, or request that the system retrain. This embodiment of the invention is particularly advantageous during network operation when the network experiences a change in configuration such as when a telephone "ring" signal is received or when a telephone receiver is picked up or when the network is physically modified by the addition of a stub such as occurs when an additional telephone is plugged in.

In accordance with still yet another embodiment of the invention, the system and method implements an adaptive error correction scheme. The system and method determines the type of the data being communicated. For example, the system and method determines whether the data is voice data, text data, graphic, video and so forth. After determining the data type, the system and method selects and applies one of a plurality of error correction methods responsive to the determined data type. Further in accordance with this embodiment of the invention, the system and method additionally or alternatively determines the channel characteristics associated with the receiver-transmitter pair and selects one of the plurality of error correction methods responsive to the channel characteristics. Advantageously, such an adaptive error correction method provides for the selection of a preferred error correction method (e.g., one better suited for video as opposed to graphics or text etc.) based on data type as well as on the particular characteristics associated with the channel to improve channel throughput or to reduce channel latency.

Figure 8:
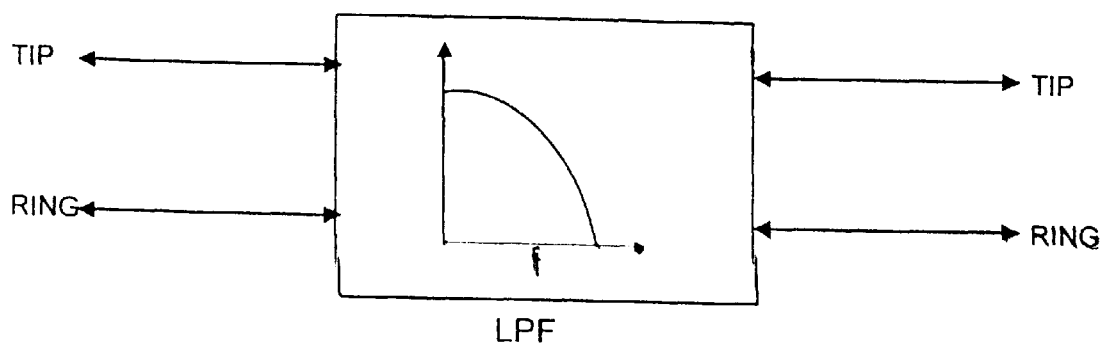
FIG. 8 shows a lowpass filter shown in the HAN illustrated in FIG. 3.

Referring back again to FIG. 3, HAN 300 performance is improved using a symmetric passive lowpass filter (filter) 308 at the telephone network interface (TNI). The telephone network interface is the demarcation point between the customer premises and the subscriber loop. Filter 308 prevents HAN signals from being placed on subscriber loop 306 and prevents noise generated on subscriber loop 306 in the HAN spectral range from intruding on HAN 300. FIG. 8 shows filter 308 coupled to TIP and RING lines on both the subscriber loop side and the customer premises side at the TNI. Filter 308 has a cutoff frequency above the frequency of the POTS services signals (e.g., above 1.1 MHz for POTS services including ADSL). Signals passing from the customer premises to the subscriber loop are lowpass filtered and similarly, signals passing from the subscriber loop to the customer premises are lowpass filtered. As stated previously, one advantage of the spectral avoidance/FDM technique of the present invention is the interoperability with legacy communications standards such as POTS, ISDN, and xDSL,. Two further advantages are that the spectral allocation of the HAN can be moved even higher up the spectrum (as shown in FIG. 4B) to: (i) avoid noisy areas of the spectrum and improve the overall system signal to noise ratio; and (ii) facilitate embodiments wherein filters 308 are inexpensive passive filters having less stringent design requirements.

To understand the impact of HAN spectral allocation on the design criteria imposed on filter 308, the filter requirements stemming from a HAN allocation just above ADSL (e.g., above 1.1 MHz) is discussed. Then, for comparison, the design criteria imposed on filter 308 when HAN spectral allocation is several MHz above ADSL (e.g., 3 or 4 MHz or higher) is discussed.

In the first example, the goal is to design a passive lowpass filter to pass ADSL signals, but not signals in the HAN spectral range, and to place the bottom of the HAN spectral range close to the upper edge of the ADSL band (e.g., close to 1.1 MHz). As ADSL signals generally have significantly reduced energy by the time they reach the customer premises, any additional insertion loss or modification of the ADSL signal would degrade reception. Therefore, the HAN lowpass filters (and diplexers) are designed for maximum transparency in the HAN spectral range. The filter is preferably designed with a cutoff frequency near the top of the ADSL band with a steep rolloff to avoid interference in the HAN spectral band. A passive 5th order Chebychev lowpass filter with 0.2 dB of ripple in the passband and a cutoff frequency of 1.2 Mhz meets this design criteria. Such a filter gives essentially flat attenuation throughout the ADSL passband of 1.1 Mhz, and provides 35 dB of attenuation by 2 Mhz.

Figure 12:
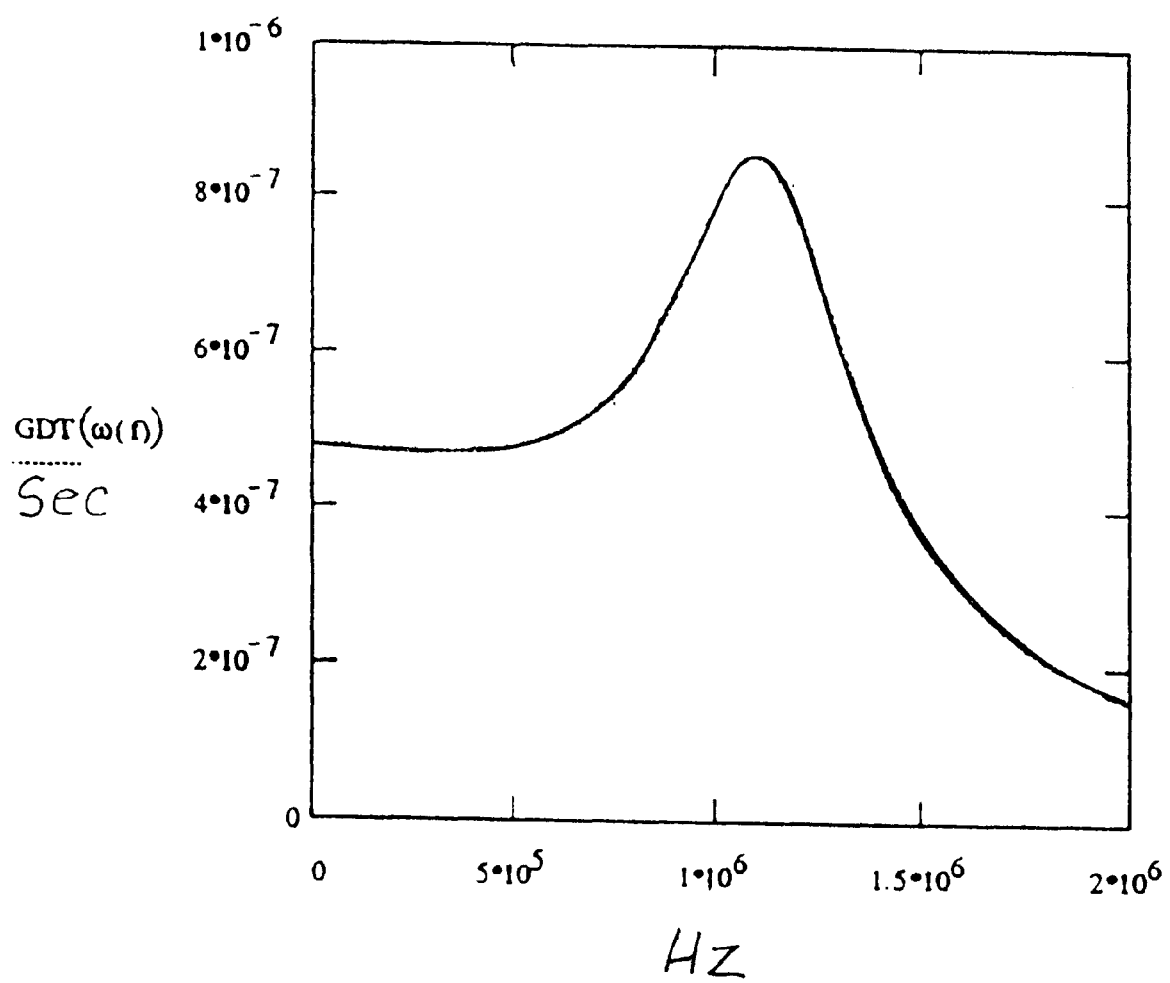
FIG. 12 is a frequency response graph illustrating the group delay associated with a filter in accordance with the invention.

FIG. 12 shows the group delay associated with thin, filter. As the group delay graph of this filter shows, there is a significant increase in group delay (over 500 nanoseconds) near the top of the ADSL passband. This rapid increase in group delay added by the passive filter could impair the ability of ADSL modems to equalize the line. This type of group response, where there is a rapid increase in group delay near the cutoff frequency, is typical of passive ladder filters of the Butterworth/Chebychev type. The group delay peak increases rapidly as the filter order is increased.

Figure 13:
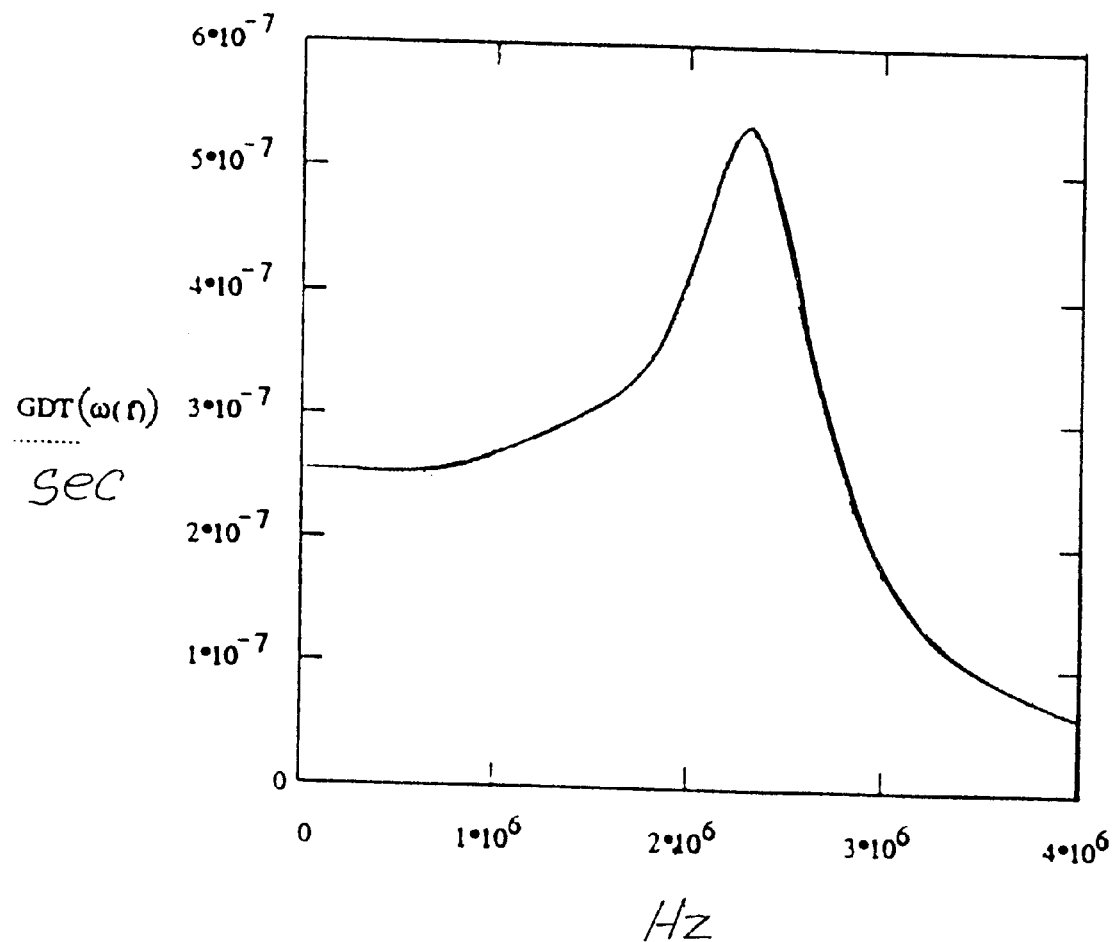
FIG. 13 is a frequency response graph illustrating the group delay associated with a filter in accordance with the invention.

However, as the lower edge of the HAN spectral range is moved up in frequency (e.g., move the HAN band up the spectrum), the design criteria for filter 308 relaxes. The cutoff frequency of the filter 308 also moves up. As a result, the area of poor group delay characteristic also moves up and into the unused frequency range between the top of the ADSL passband and the bottom of the HAN spectral range. For example, consider the selection of design criteria in a system using HAN band 411 having a lower frequency of 4 MHz. FIG. 13 graphs the group delay characteristics of a passive 5th order Chebychev lowpass filter with 0.2 dB of ripple in the passband and a cutoff frequency of 2.5 Mhz. The group delay increases over 300 ns from 1.5 Mhz to 2.5 Mhz, and in particular there is a rapid increase in group delay from 2.1 Mhz to 2.3 Mhz, but this will not adversely affect either the HAN or ADSL signaling because the increase occurs in the transition band. The filter gives essentially flat attenuation and constant group delay throughout the ADSL passband, yet provides 35 dB of attenuation by 4 Mhz. Note that moving the cutoff frequency up to 2.5 Mhz substantially decreases the values of the inductive elements in the filter—this is beneficial because smaller inductors cost less, and have higher self resonance frequencies.

Further movement of the bottom of the HAN spectral range up in frequency would allow the use of lower order filters with shallower rolloff, thus saving cost.

Figure 9:
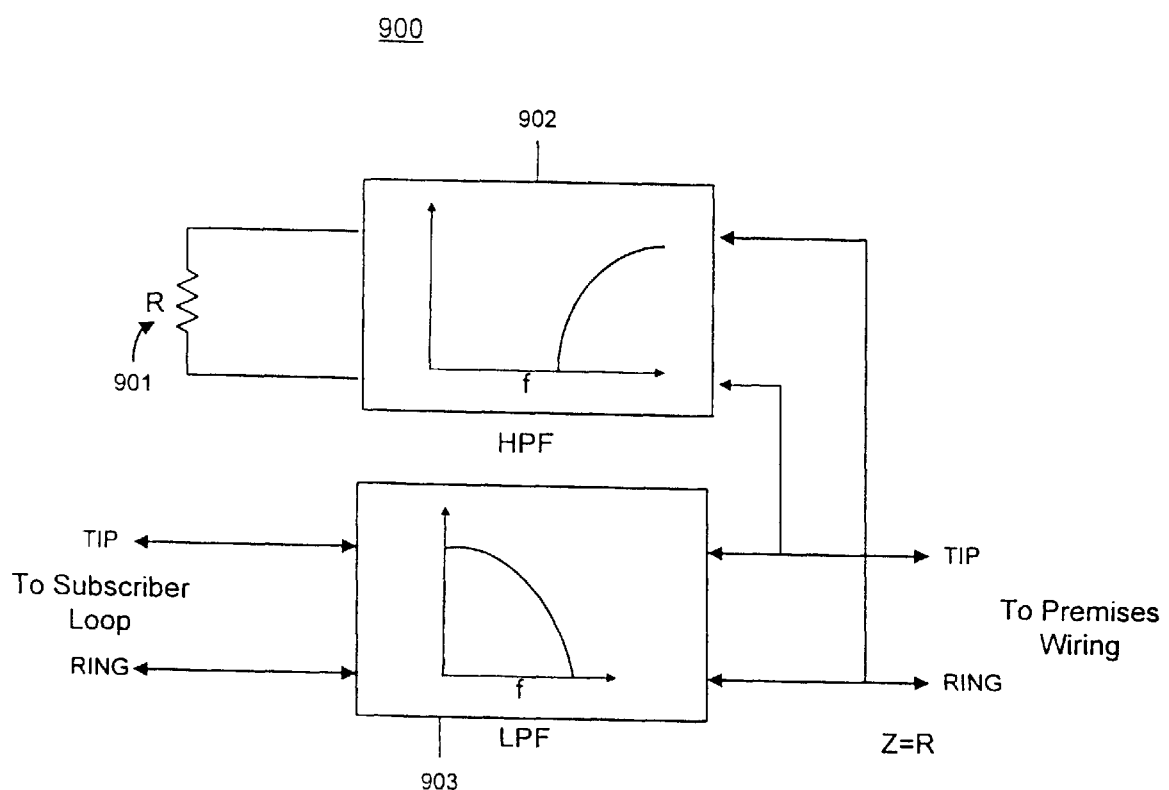
FIG. 9 shows diplexer filter which is alternatively used in place of the lowpass filter shown in the HAN illustrated in FIG. 3.

Lowpass filter 308 reflects signal energy in the filter stopband (e.g., in the HAN spectral range) back onto the POTS wiring. This reflected energy degrades signal quality, and although this can be compensated for using adaptive equalization at the receiver, it is advantageous if lowpass filter 308 is replaced at the TNI by a diplexer filter. FIG. 9 shows a passive diplexer filter 900. Use of diplexer filter 900 at the TNI advantageously provides a matched termination impedance to HAN 300 at HAN 300 operating frequencies starting in the 3–4 MHz range. Matching termination impedance advantageously reduces signal reflections on HAN 300 thereby improving signal quality. Diplexer filter 900 includes a 100 ohm resistor 901, highpass filter 902 (having a passband starting in the 3–4 MHz range—corresponding to the HAN operating frequency range) and lowpass filter 903 (having a cutoff not below 1.2 MHz). Lowpass filter 903 is connected in-line with the POTS wiring 301 at the telephone network interface. Termination resistor 901 is coupled to HAN 300 via highpass filter 902. Thus, the impedance matching effect of termination resistor 901 is limited to frequencies in the passband of highpass filter 902. For frequencies at which HAN 300 operates, and also the frequencies that highpass filter 902 passes signals, the impedance (z) of POTS wiring 301 has an almost purely resistive impedance that is closely approximated by the 100 ohm resistor 901.

Figure 10:
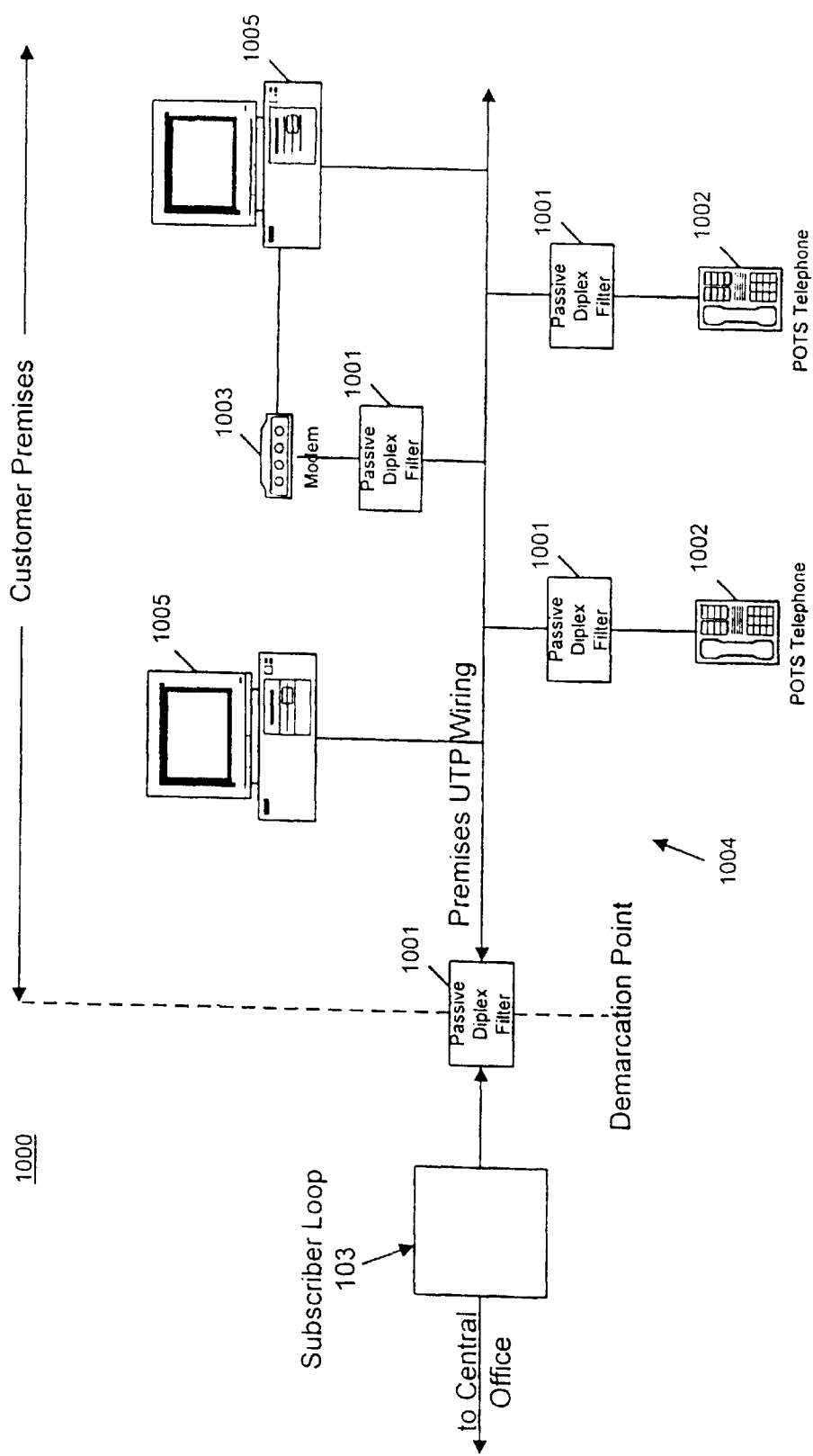
FIG. 10 shows an alternative embodiment of a HAN using filters at customer premises equipment in accordance with the present invention.

FIG. 10 shows HAN 1000, an alternative embodiment of a HAN in accordance with the present invention. HAN 1000 includes passive diplex filters 1001 at the interface of customer premises equipment (e.g., POTS telephones 1002 and modem 1003). HAN 1000 additionally includes POTS wiring 1004 and network clients 1005. HAN 1000 couples network clients 1005 to form a computer network using existing customer premises wiring (POTS wiring 1004) by frequency division multiplexing as discussed in reference to FIG. 3. Filters 1001 improve HAN 1000 performance by (i) preventing energy in the HAN spectral range (e.g. starting at 3–4 MHz) from entering POTS wiring 1004; (ii) preventing energy in the HAN spectral range from being aliased down to the operating frequency range of the customer premises equipment (POTS telephones 1002 and modem 1003); and (iii) providing a matched termination to HAN 1000. Matching the termination of HAN 1000 is particularly advantageous in the case of POTS telephones which change impedance in the HAN spectral range when switching from on hook to off hook (e.g., when the handset is picked up).

Figure 11:
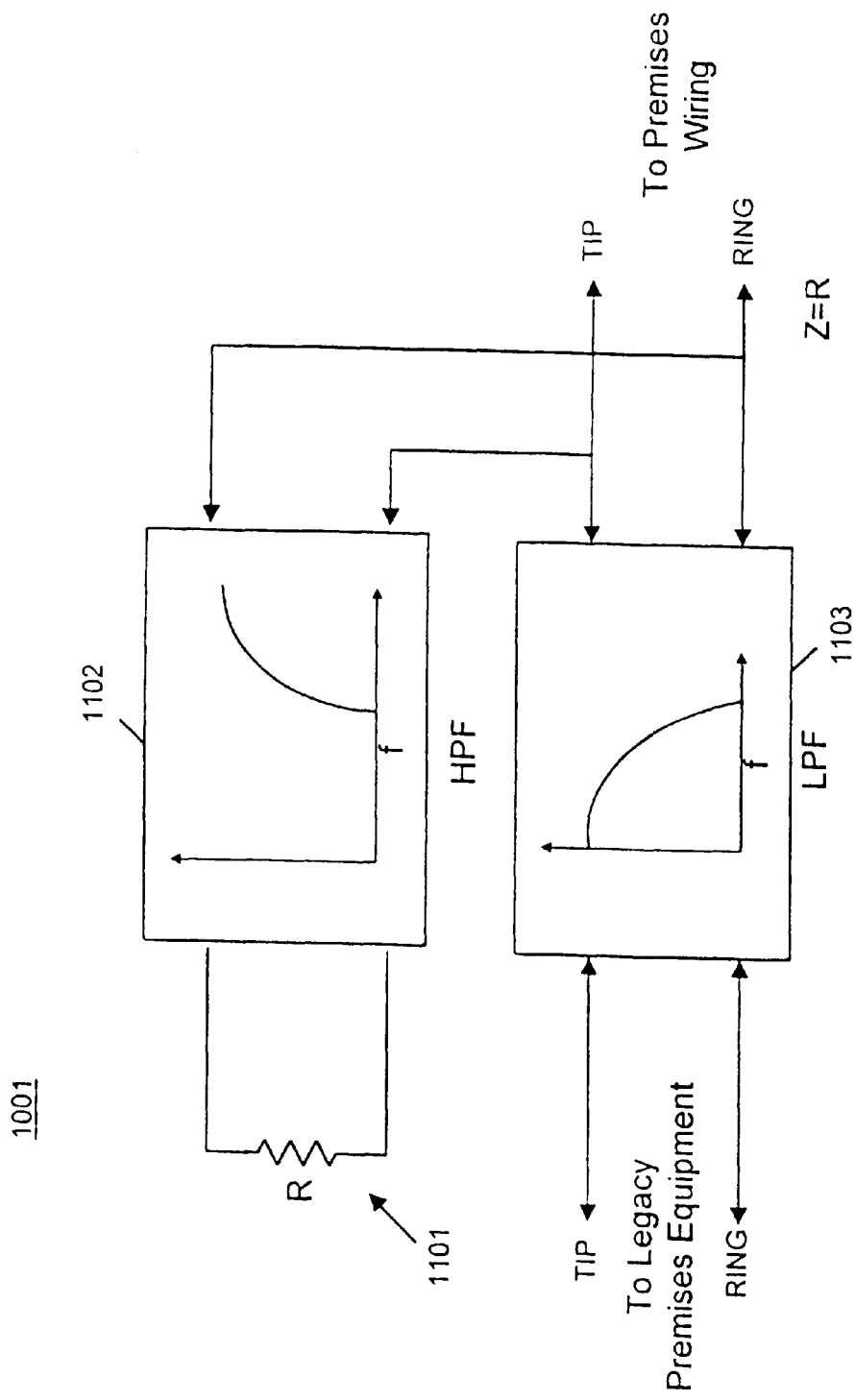
FIG. 11 is a block diagram of the diplexer filters used to connect the legacy POTS customer premises equipment to the HAN as shown in FIG. 10.

FIG. 11 is a block diagram of the diplex filters 1001 used at the interface of the POTS telephones 1002 and modem 1003 as shown in FIG. 10. Filter 1001 includes a 100 ohm resistor 1101 coupled to a highpass filter 1102 (having a pass band starting between 3 and 4 MHz) and a lowpass filter 1103 (having a cutoff not below 1.2 MHz). Resistor 1101 provides a matched termination to HAN 1000 at its operating frequencies.

The filters shown in and described in reference to FIGS. 3 and 8–11 are preferably passive filters that support telephone voltages and currents. These passive filters pass DC signals on the subscriber loop to the Customer premises wiring, even in the event of a power failure. Use of such passive filters in conjunction with the frequency division multiplexing (FDM) spectral avoidance technique of the present invention enable continued telephone service in the event of a local AC power failure ("lifeline services"). Ordinary telephone service continues, despite the power failure, because conventional POTS telephones operate off of a DC current supplied by the central office. Advantageously, there is thus no need for a backup battery to ensure continued availability of telephone service in the event of a power failure. In contrast, conventional PBX systems located at a customer premises cannot offer lifeline service unless they also provide battery backup. This is because they are installed between the subscriber loop and the customer premises wiring and thus "break" the electrically contiguous subscriber loop which ordinarily provides the DC current.

It should be understood that in alternative embodiments, the baseband signals occupying the POTS wiring are derived from sources other than the subscriber loop. In other embodiments, the baseband signals are derived from a wireless telecommunications link, a coaxial cable-based source or other wide area networking means. For example, alternative embodiments support delivery of broadband digital data throughout the home from varied sources such as satellite (DSS/DVB), terrestrial microwave (MMDS), digital cable/CATV ("All TV"), digital or high definition television (DTV/HDTV/ATV) and digital video disk (DVD) drive.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A local area computer network for networking a plurality of network clients at a customer premises, the network clients communicating using analog bandpass signals, comprising:

an infrastructure of unshielded twisted pair (UTP) wiring at the customer premises, the UTP wiring disposed to send and receive plain old telephone service (POTS) signals;

at plurality of network clients coupled to the UTP wiring;

at least one network client having a network interface transmitter module including:
a signal modulator having signal processing modules configured to convert a digital bit stream into a modulated digital bandpass signal at an output of the signal modulator;
analog interface circuitry including a digital to analog converter coupled to the signal modulator output, the analog interface circuitry configured to convert the modulated digital bandpass signal to an analog bandpass signal coupled to the customer premises wiring; and at least one network client having a network interface receiver including:
analog interface circuitry having an input coupled to the customer premises wiring, the analog interface circuitry including an analog to digital converter having an output; and
a bandpass signal demodulator coupled to the output of the analog to digital converter, the bandpass demodulator having signal processing modules configured to convert digitized bandpass signals to baseband digital bit streams suitable for processing by the network client.

2. The system of claim 1 further comprising:
at least one POTS compatible device coupled to the customer premises wiring; and
a wide area network interface coupled to the customer premises wiring, the wide area network delivering POTS services to the customer premises wiring.

3. The system of claim 2 wherein the wide area network is the public switched telephone network (PSTN).

4. The system of claim 2 wherein the wide area network is a coupling to a subscriber loop.

5. The system of claim 2 wherein the wide area network interface is a coupling to a coaxial cable transmission medium.

6. The system of claim 2 wherein the wide area network interface is a coupling to a wireless transmission medium.

7. The system of 2 further comprising a passive filter coupled to the POTS compatible device, the lowpass filter having a stopband including at least the portion of the spectrum occupied by the analog bandpass signals.

8. The system of claim 7 wherein the filter is a passive diplexer filter having an impedance matching the impedance of the UTP wiring for a frequency range corresponding to the bandpass signals.

9. The system of claim 8 further comprising a passive filter at the wide area network interface, the filter having a stopband including at least the portion of the spectrum occupied by the analog bandpass signals.

10. The system of claim 9 wherein the filter is a passive diplexer filter having an impedance matching the impedance of the UTP wiring for a frequency range corresponding to the bandpass signals.

11. The system of claim 1 wherein the bandpass demodulator is a quadrature phase shift keyed (QPSK) demodulator.

12. The system of claim 1 wherein the bandpass demodulator is a quadrature amplitude modulation (QAM) demodulator.

13. The system of claim 1 wherein a network client having a transmitting network interface module further comprises:
a digital video interface configured to receive a digital video bit stream from a video source, the digital interface coupled to the transmitting network interface module to deliver the received digital video bit stream to a network client having a receiving network interface module.

14. The system of claim 13 wherein the video source is a digital satellite service.

15. The system of claim 13 wherein the video source is a coaxial cable-based source.

* * * * *